United States Patent [19]
Kasamatsu et al.

[11] Patent Number: 5,357,344
[45] Date of Patent: Oct. 18, 1994

[54] METHOD OF AND APPARATUS FOR RECORDING HALFTONE IMAGE

[75] Inventors: Toshio Kasamatsu; Takuya Yamaguchi, both of Kyoto, Japan

[73] Assignee: Dainippon Screen Mfg. Co., Ltd., Japan

[21] Appl. No.: 531,698

[22] Filed: Apr. 20, 1990

[30] Foreign Application Priority Data

Sep. 16, 1988 [JP] Japan .................. 63-232789

[51] Int. Cl.⁵ .................. H04N 1/23; H04N 1/40
[52] U.S. Cl. .................. 358/298; 358/456; 358/515; 358/536
[58] Field of Search ........ 358/298, 456, 458, 459, 358/75, 80, 500, 578, 534, 296, 515, 536

[56] References Cited

U.S. PATENT DOCUMENTS

| | | | |
|---|---|---|---|
| 4,149,194 | 4/1979 | Holladay | 358/298 X |
| 4,185,304 | 1/1980 | Holladay | 358/298 |
| 4,578,714 | 3/1986 | Sugiura et al. | 358/456 |
| 4,673,971 | 6/1987 | Ikuta et al. | 358/75 |
| 4,942,460 | 7/1990 | Inagaki et al. | 358/75 |
| 5,067,025 | 11/1991 | Kitagawa | 358/298 |

FOREIGN PATENT DOCUMENTS

| | | |
|---|---|---|
| 0264754 | 4/1988 | European Pat. Off. |
| 0292732 | 11/1988 | European Pat. Off. |
| 8405006 | 12/1984 | PCT Int'l Appl. |

*Primary Examiner*—Benjamin R. Fuller
*Assistant Examiner*—Eric Frahm
*Attorney, Agent, or Firm*—Ostrolenk, Faber, Gerb & Soffen

[57] ABSTRACT

An apparatus records a halftone area and a solid area in a single image with respective, different screen angles. Encoders (13, 14) and a coordinate value generator (16) generate coordinate values (U, V) on an image plane on a recording drum. An address generator (17), a pattern data memory (18) and a comparator (19) generate a first halftone dot signal ($S_{da}$) for the halftone area. An address generator (22) and a pattern data memory (23) generate a second halftone dot signal ($S_{db}$) for the solid area. A threshold data setter (20) and a comparator (21) generate a detection signal ($S_s$) which indicates whether or not an image signal ($S_i$) corresponds to the solid area. One of the first and second halftone dot signals ($S_{da}$ or $S_{db}$) is selected by a selector (24) according to the detection signal ($S_s$).

9 Claims, 8 Drawing Sheets

METHOD OF AND APPARATUS FOR RECORDING HALFTONE IMAGE

BACKGROUND OF THE INVENTION

1. Field of the Invention

The present invention relates to an apparatus, such as color image scanner, for recording an image and a method thereof, and more particularly, it relates to a method of and an apparatus for recording a halftone image while electronically generating halftone dot patterns.

2. Description of the Prior Art

FIG. 1 is a block diagram showing the structure of a halftone image scanner of the prior art. The image scanner comprises a reading drum 2 and a recording drum 5. A color original 1 is wound around the reading drum 2, and photosensitive material 4, such as a photosensitive film, is wound around the recording drum 5. The reading drum 2 and the recording drum 5 are rotated synchronously by motors 3 and 6 along directions $\theta$ and $\phi$, respectively.

While the drums 2 and 5 are rotating, a pick-up head 7 is driven by a motor 9 and a feed screw 11 at a prescribed speed along a subscanning direction X parallel to the axial direction of the reading drum 2. The pick-up head 7 reads the original 1 with respect to successive scanning lines along a circumferential direction (or a main scanning direction Y) of the reading drum 5. The pick-up head 7 includes a photoelectric unit for generating color separation signals R, G and B for red, green and blue, respectively, in response to the color tone and density of each pixel on the original 1. The color separation signals R, G and B are supplied to a signal processing unit 100 to be converted therein into a light modulation signal $S_d$, as will be described later in detail.

While the pick-up head 7 is reading the original 1, a recording head 8 is driven by a motor 10 and a feed screw 12 at a prescribed speed along a subscanning direction U parallel to the axial direction of the recording drum 5. The recording head 8 exposes the photosensitive material 4 and records color separation images according to the light modulation signal $S_d$.

The motor 6 is connected to an encoder 13 which generates a clock pulse K in proportion to the angle of rotation of the recording drum 5. The number of clock pulses K indicates the position of the recording head 8 along a main scanning direction V. The motor 10 is connected to an encoder 14 which generates a clock pulse L in proportion to the axial movement of the recording head 8. The number of clock pulses L indicates the position of the recording head 8 along a subscanning direction U.

The color separation signals R, G and B are converted into the light modulation signal $S_d$ in the signal processing unit 100 as follows. The color separation signals R, G and B are supplied to a color computation circuit 15. The color computation circuit 15 executes color correction and gradation correction on the color separation signals R, G and B to convert them into image signals $S_i$ which correspond to yellow magenta cyan and black colors. The clock pulses K and L from the rotary encoders 13 and 14 are supplied to a coordinate value generator 16 where they are converted into coordinate values U and V. The coordinate values U and V are defined along the subscanning direction U and the main scanning direction V, respectively, and expressed in a unit of pixel on the recording drum 5.

The coordinate values U and V are supplied from the coordinate value generator 16 to an address generator 17 and converted into reading address signals $S_{a1}$ and $S_{a2}$. The reading address signals $S_{a1}$ and $S_{a2}$ are supplied from the address generator 17 to a pattern data memory 18. The pattern data memory 18 stores halftone pattern data $S_h$ representing threshold data which are compared with the signals $S_i$ to produce halftone signals $S_d$ for yellow magenta cyan and black printers. The halftone pattern data $S_h$ is read out from the pattern data memory 18 in response to the reading address signal $S_{a1}$ and $S_{a2}$, and supplied to a comparator 19. The comparator compares the halftone pattern data $S_h$ and the values of the image signals $S_i$ supplied from the color computation circuit 15, and generates the halftone dot signal $S_d$ for each pixel in accordance with the result of the comparison. The halftone dot signal $S_d$ is finally supplied from the comparator 19 to the recording head 8 as a light modulation signal.

The recording head 8 turns a light beam on and off in response to the light modulation signal $S_d$ to thereby expose the photosensitive material 4. In this manner, color separation images are recorded on the photosensitive material 4 with respect to each scanning line.

When the halftone image scanner described above is utilized to produce color separation images for the halftone gravure process, the following problem occurs. In carrying out the process in an inverted halftone gravure, different screen angles are applied to a solid area and to a halftone area in a single printing plate. Usually, color printing utilizes four printing plates for yellow, magenta, cyan and black printers. Halftone areas in the four printing plates are produced with different screen angles, e.g. 90°, 15°, 75° and 45° apart. On the other hand, solid areas in the four printing plates are all produced with a single screen angle of 45°. The screen angle of the solid areas is chosen to prevent a doctor blade, which removes excessive ink on a printing plate, from becoming oriented parallel to the walls which separate the hollowed cells in the printing plate. If the doctor blade becomes parallel to the walls, excessive ink is not removed properly, causing the printed sheet to be mottled. In producing one of the four printing plates, a first halftone film is produced for the solid area while the screen is manually set at about 45°. A second halftone film is produced for the halftone area with the halftone image scanner while the screen angle is automatically set by the scanner. Finally, the first and second halftone films are manually combined to form an overall halftone film with which the printing plate is produced. The above-described steps for producing the overall halftone film are laborious and inefficient.

SUMMARY OF THE INVENTION

The present invention is directed to method of and an apparatus for recording a halftone image including a halftone area and a solid area. The apparatus comprises (a) recording means for recording an image as a function of a given recording signal, (b) means for generating positional information indicating a position on an image plane in the recording means, (c) means for generating a first halftone dot signal representing the halftone area in the image on the basis of the positional information, first halftone data representing a changeable shape of a halftone dot in the halftone area and a given image signal representing the image, (d) detecting means for detecting whether or not the image signal corresponds to the solid area in the image, and generating a detection signal indicating that the image signal corresponds to the solid area, (e) means for generating a second halftone dot signal on the basis of the positional information and second halftone data representing a shape of a halftone dot in the solid area, the second halftone dot signal representing the solid area having a prescribed halftone area rate, and (f) means for selecting one of the first and second halftone dot signals according to the detection signal, and supplying a selected halftone dot signal to the recording means as the recording signal.

According to one aspect of the invention, the detecting means comprises a memory for storing threshold data and a comparator for comparing the threshold data and the value of the image signal and generating the detection signal according to the result of the comparison.

According to another aspect of the invention, the recording means records a plurality of color separation images with respect to the image, and the second halftone dot signal is common to the plurality of color separation images.

Preferably, the second halftone dot signal represents a solid area having a screen angle of about 45 degrees.

The recording signal may be a light modulation signal, and the recording means may expose photosensitive material as a function of the light modulation signal to record the plurality of color separation images.

The plurality of color separation images may be obtained on color separation films employed in halftone gravure process.

Accordingly, an object of the present invention is to provide a method of and an apparatus for producing a halftone image which has respective screen angles for the solid area and the halftone area.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
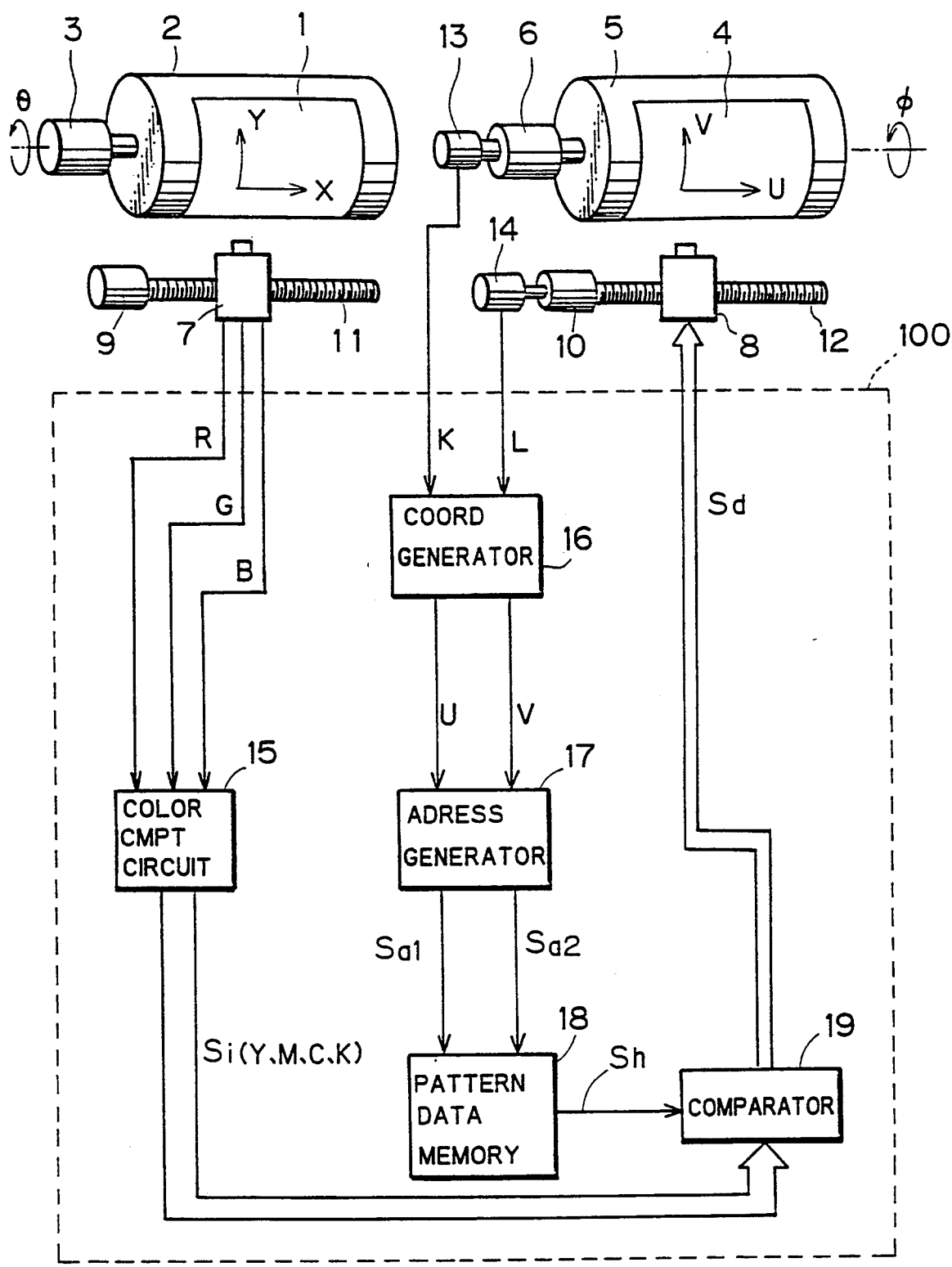
FIG. 1 is a block diagram showing the structure of a halftone image scanner of the prior art.
Figure 2A:
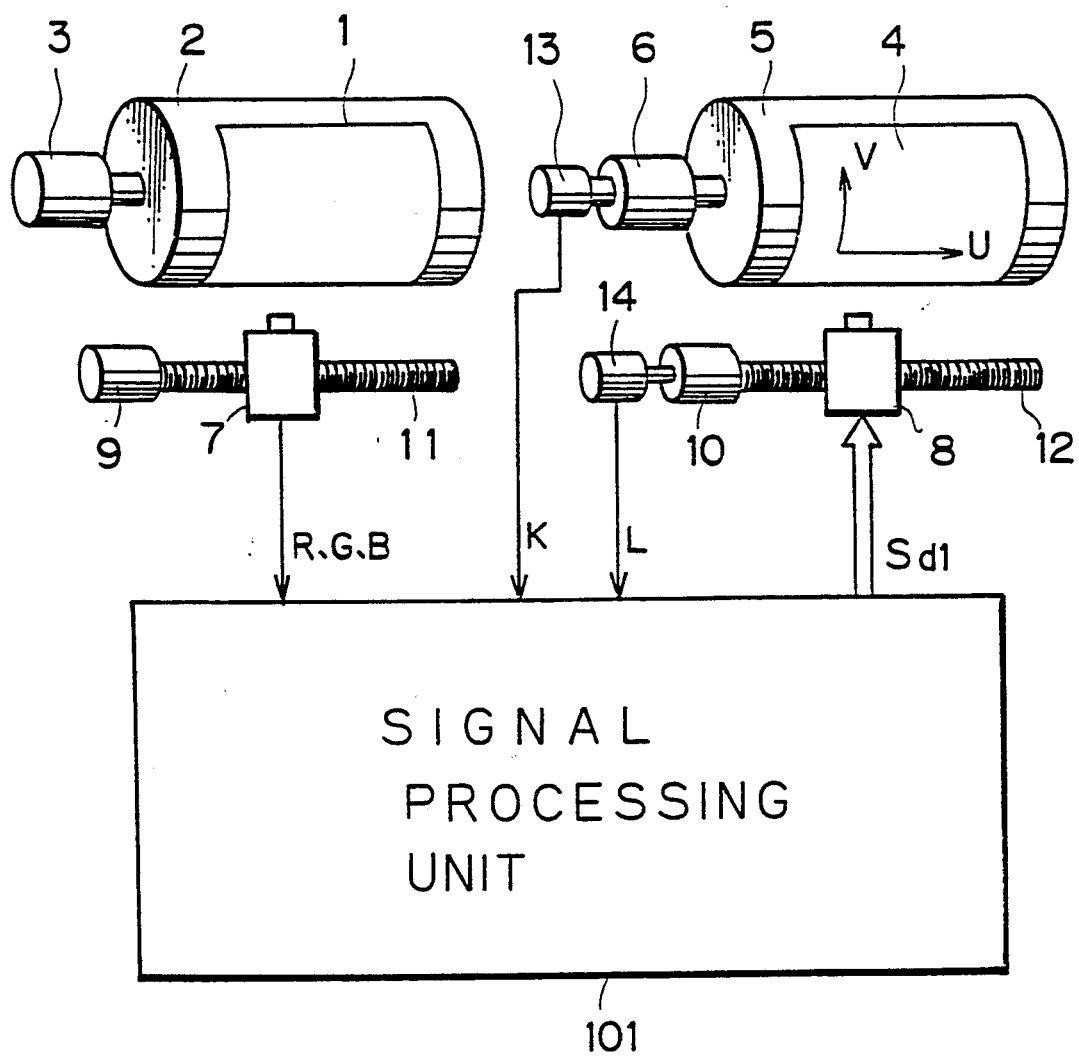
FIG. 2A and FIG. 2B are block diagrams showing the structure of a preferred embodiment of the present invention.

FIG. 2A is a block diagram showing the structure of a halftone image scanner according to the present invention. The halftone image scanner comprises a reading drum 2, a motor 3 therefor, a recording drum 5, a motor 6 therefor, a pick-up head 7, a set of a feed screw 11 and a motor 9 for feeding the pick-up head 7, a recording head 8, a set of a feed screw 12 and a motor 10 for feeding the recording head 8, an encoder 13 for the motor 6 and an encoder 14 for the motor 10, all of which are the same as those shown in FIG. 1. The halftone image scanner further comprises a signal processing unit 101.

Figure 2B:
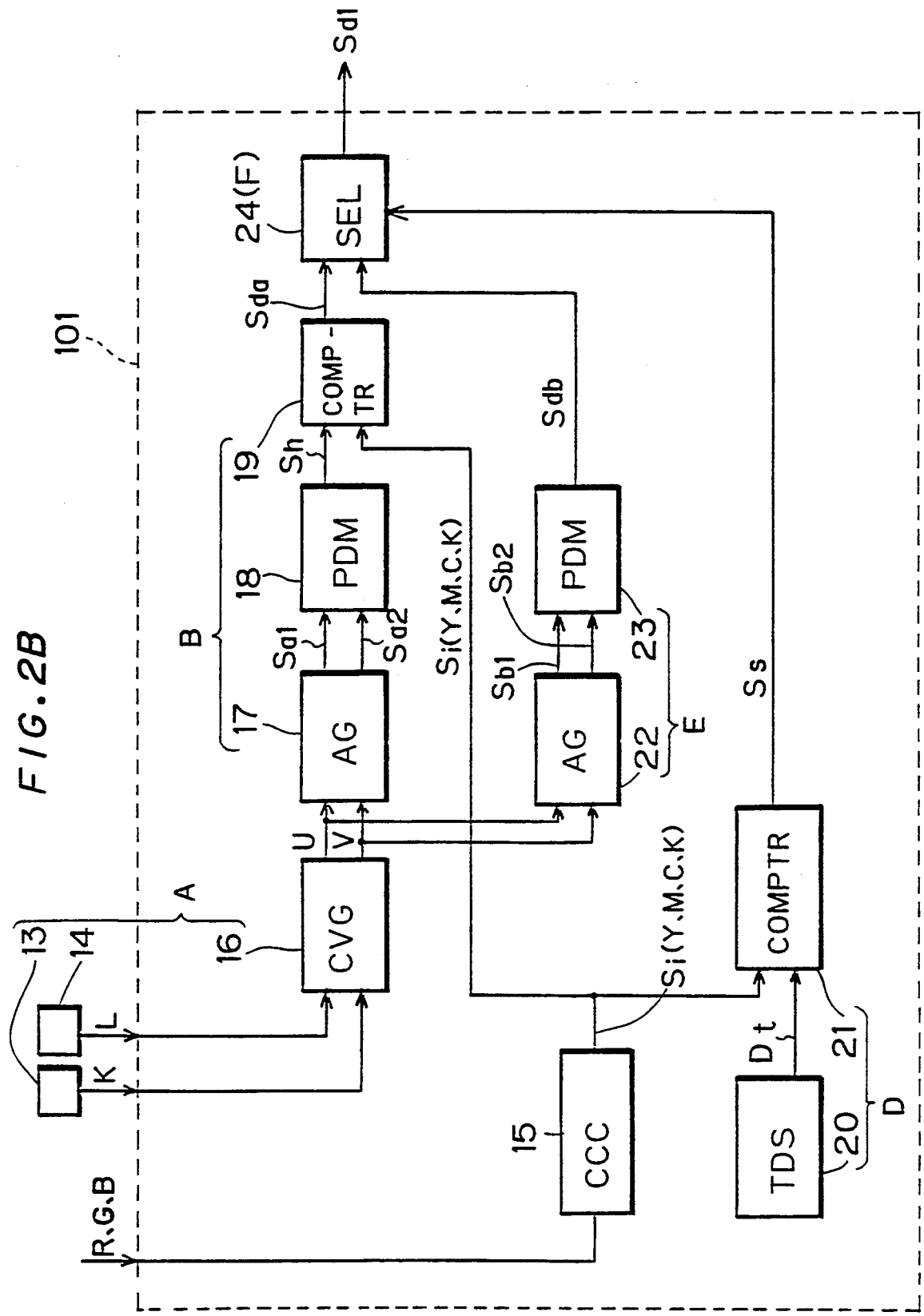

FIG. 2B is a block diagram showing the internal structure of the signal processing unit 101. The signal processing unit 101 comprises a color computation circuit 15, a coordinate value generator 16, an address generator 17, a pattern data memory 18 and a comparator 19, which are also the same as those shown in FIG. 1.

The two encoders 13 and 14, and the coordinate value generator 16 function as a whole as a means A for generating positional information on the recording drum 5. The address generator 17, the pattern data memory 18 and the comparator 19 function as a whole as a means B for generating a halftone dot signal for a halftone area.

Figure 3A:
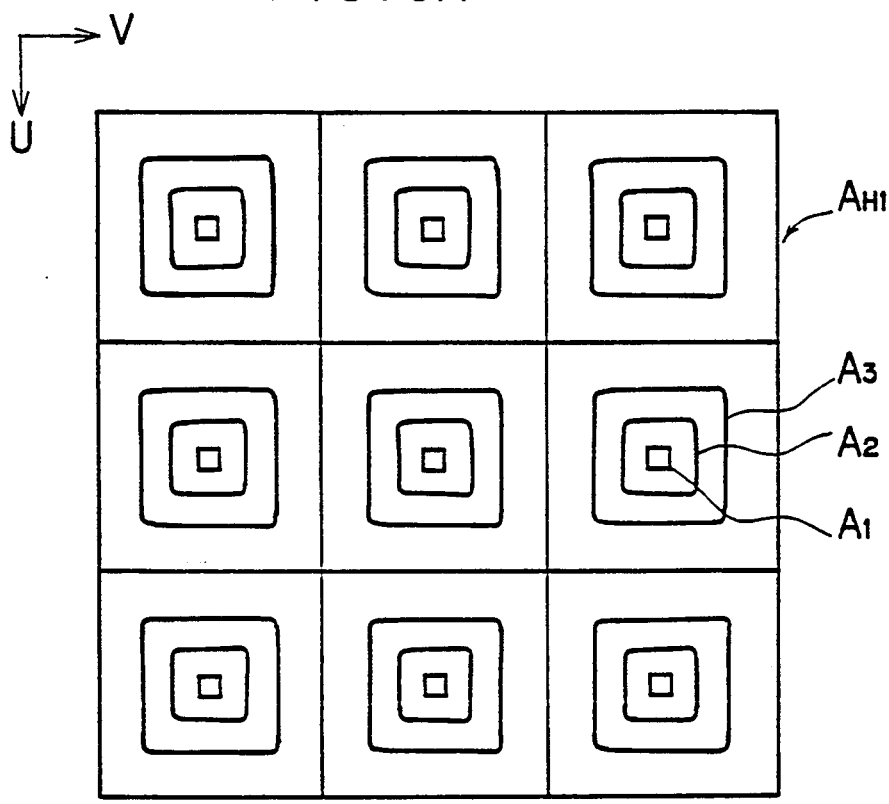
FIG. 3A and FIGS. 4A through 4D illustrate halftone dot arrays in halftone areas.
Figure 3B:
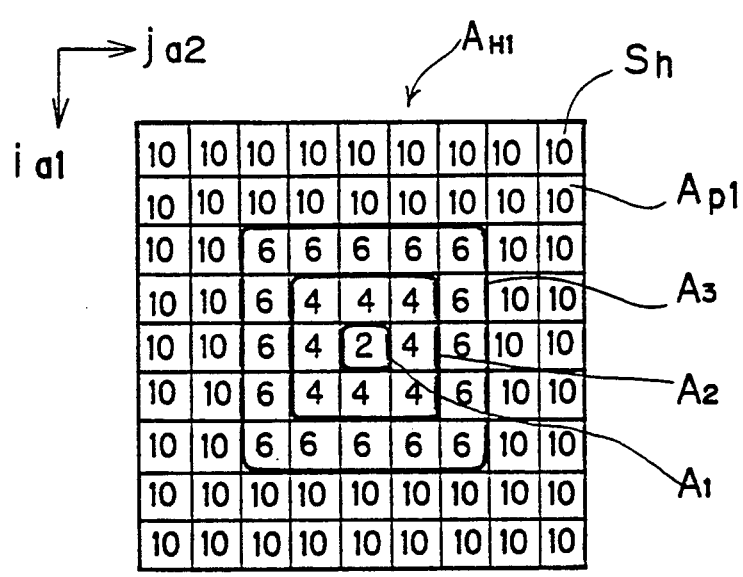
FIG. 3B illustrates halftone pattern data assigned in a halftone dot in a halftone area.
Figure 4B:
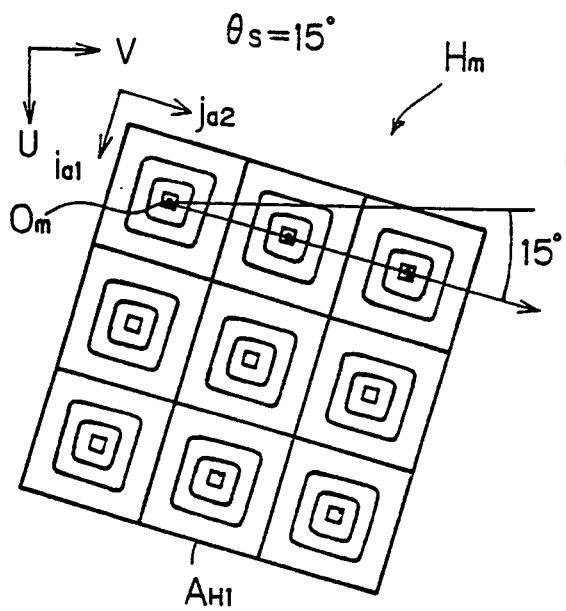
Figure 4A:
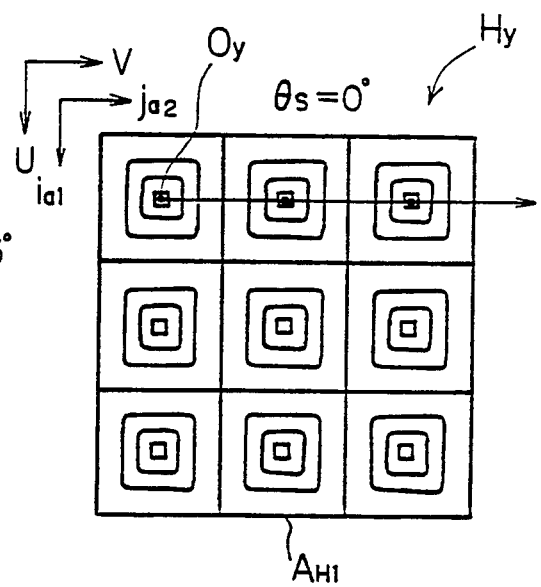
Figure 4D:
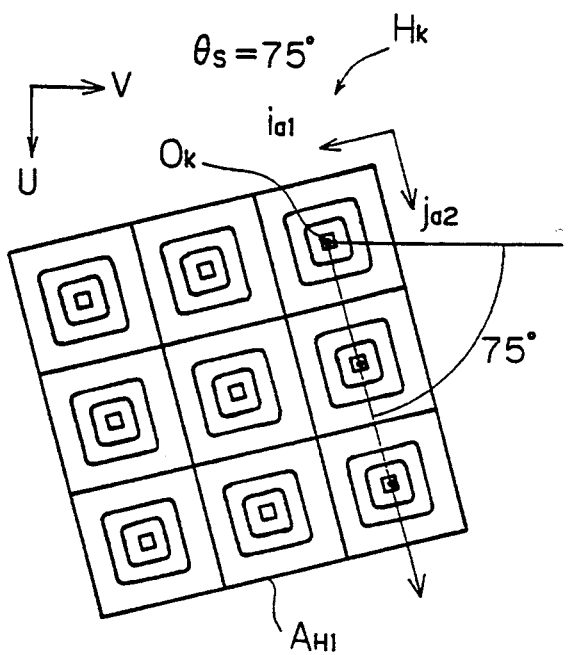
Figure 4C:
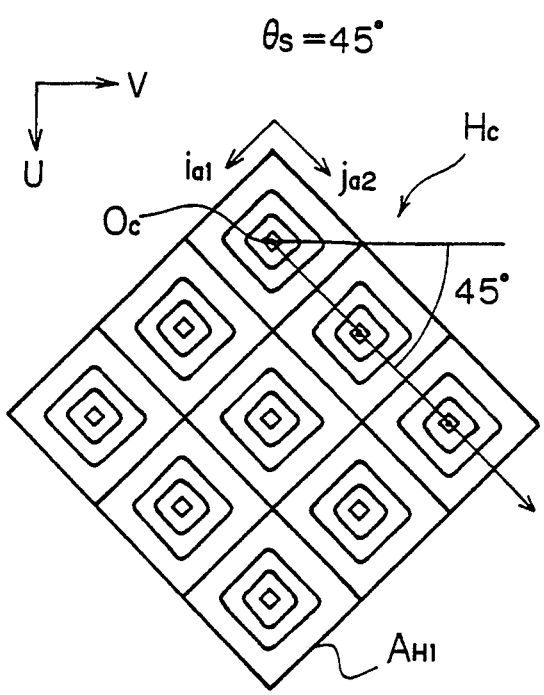

FIG. 3A illustrates a halftone dot array on an image plane. The halftone dots $A_{H1}$ are so arrayed as to form a square grid parallel to a main scanning direction V and a subscanning direction U on the recording drum 5. FIG. 3B illustrates halftone pattern data $S_h$ assigned in a halftone dot $A_{H1}$. The halftone dot $A_{H1}$ is a square which includes a certain number of pixels $A_{p1}$ arrayed along address directions $i_{a1}$ and $j_{a2}$. The halftone pattern data $S_h$ is assigned to every pixel $A_{p1}$ in the halftone dot $A_{H1}$, and so arrayed that its value increases from the center to the periphery of the halftone dot $A_{H1}$.

When the coordinate values U and V are supplied from the coordinate value generator 16 to the address generator 17, the address generator 17 generates reading address signals $S_{a1}$ and $S_{a2}$ which indicate a position in the halftone dot $A_{H1}$ along the address directions $i_{a1}$ and $j_{a2}$. The pattern data memory 18 outputs one of the halftone pattern data $S_h$ of a particular pixel designated by the address signals $S_{a1}$ and $S_{a2}$. The halftone pattern data $S_h$ is supplied to the comparator 19 and compared therein with image signals $S_i$ generated by the color computation circuit 15. The halftone pattern data $S_h$ functions as a threshold data in determining whether the particular pixel is to be exposed or not. That is, if the value of the image signal $S_i$ is greater than the halftone pattern data $S_h$, the pixel is exposed; a halftone dot signal $S_{da}$ assumes a "1" level. Therefore, the greater the value of the image signal $S_i$, the greater the size of exposed area. The contours $A_1$, $A_2$ and $A_3$ shown in FIGS. 3A and 3B represent shapes of the exposed area in relation to the value of the image signal $S_i$. In this embodiment, the value of image signal $S_i$ is less than ten. Therefore, the peripheral region which is at the outside of the contour $A_3$ in halftone dot $A_{H1}$ is left unexposed.

The halftone dot array of FIG. 3A corresponds to one of the four color separation images employed for the color process. FIGS. 4A through 4D illustrate halftone dot arrays $H_y$, $H_m$, $H_c$ and $H_k$ for yellow, magenta, cyan and black printers, respectively. These arrays have respective screen angles $\theta_s$ of 0°, 15°, 45° and 75°. The screen angle $\theta_s$ is defined as the angle between the main scanning direction V and one of the two axis of the square grid of the array, where the square grid is formed of lines drawn parallel to the address directions $i_{a1}$ and $j_{a2}$ through the center points $O_y$ (or $O_m$, $O_c$ and $O_k$) of the halftone dots $A_{H1}$. The pattern data memory 18 stores respective halftone pattern data $S_h$ for the four color separation images, which have respective screen angles $\theta_s$ of 0°, 15°, 45° and 75°, for example.

The signal processing unit 101 has another pair of elements comprises an address generator 22 and a pattern data memory 23. The pattern data memory 23 stores values of a halftone dot signal $S_{db}$ for a solid area.

The address generator 22 and the pattern data memory 23 function together as a means E for generating a halftone dot signal for a solid area.

Figure 5A:
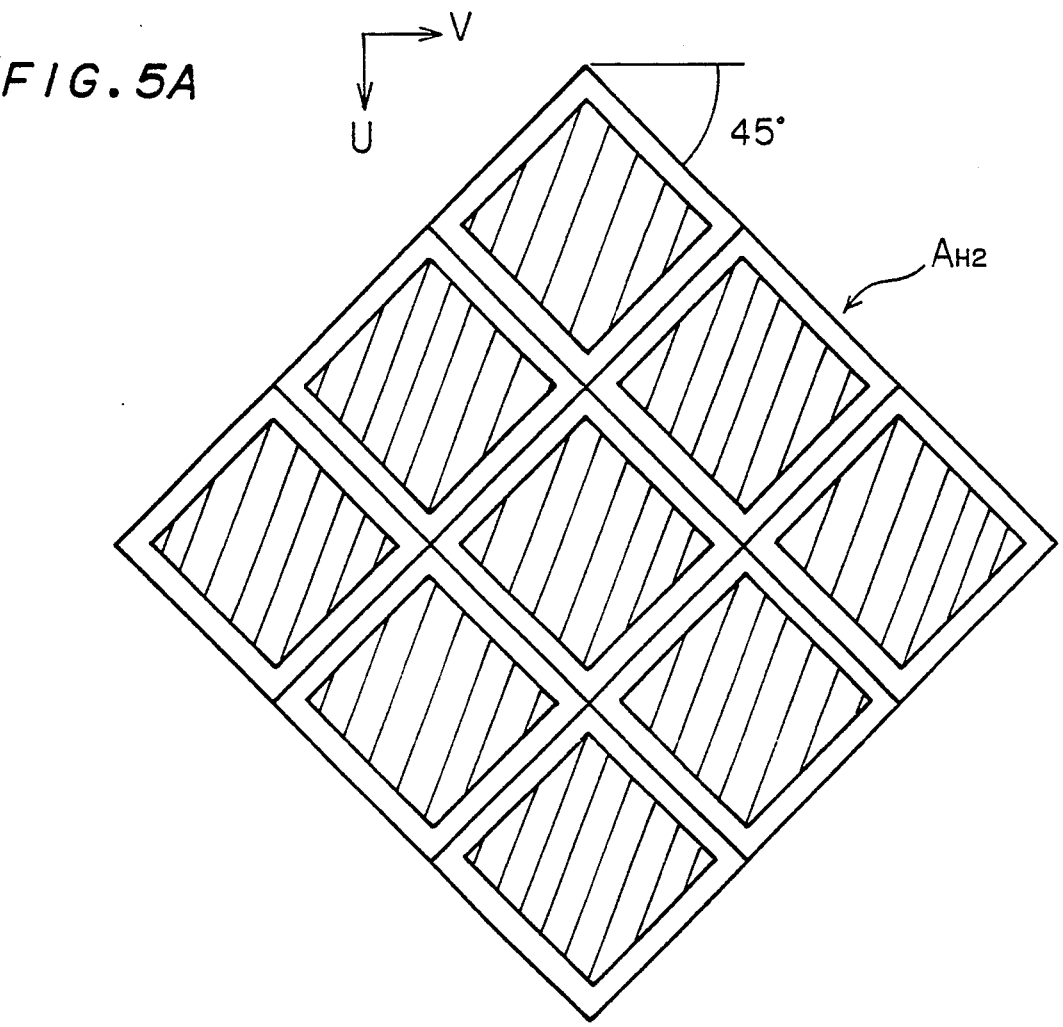
FIG. 5A illustrates a halftone dot array in a solid area.
Figure 5B:
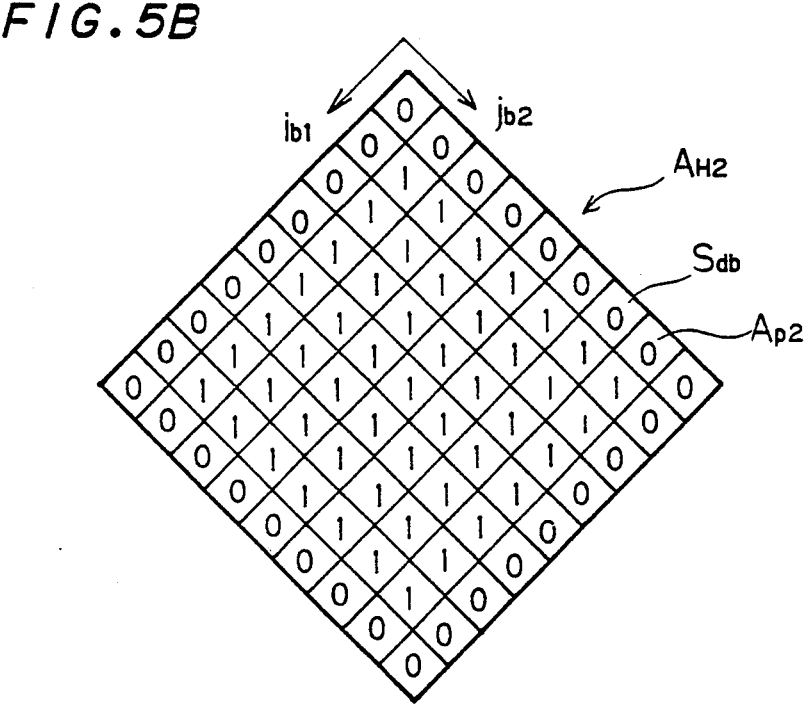
FIG. 5B illustrates halftone dot data assigned in an halftone dot in a solid area.

FIG. 5A illustrates a halftone dot array on an image plane. Halftone dots $A_{H2}$ are so arrayed as to form a square grid which is inclined at about 45 degrees to the main scanning direction V. That is, the screen angle of the halftone dot array is about 45 degrees. FIG. 5B illustrates the halftone dot data $S_{db}$ assigned to the halftone dot $A_{H2}$. The halftone dot $A_{H2}$ is a square which includes a certain number of pixels $A_{p2}$ arranged along address directions $i_{b1}$ and $j_{b2}$. The halftone dot data $S_{db}$ is assigned to every pixel $A_{p2}$ in the halftone dot $A_{H2}$. The value of the halftone dot data $S_{db}$ is zero at the periphery and one at the inside region. That is, the inside region is always exposed while the peripheral region is always unexposed. In the halftone gravure process, a color separation image of the solid area on a printing plate is produced as a halftone image of a certain halftone-area rate in the range of 55 to 75%. The halftone area rate of the solid area depends on various printing conditions, such as a type of ink, especially its viscosity, printing speed, etc.. The halftone area rate of the halftone dot $A_{H2}$ shown in FIG. 5B is 60%.

The halftone pattern data $S_h$ for the halftone area are prepared for respective four color separation images which have respective screen angles $\theta_s$ as was described before. On the other hand, the halftone dot data $S_{db}$ for the solid area is commom to the four color separation images.

When the coordinate values U and V are supplied from the coordinate value generator 16 to the address generator 11, the address generator 17 generates reading address signals $S_{b1}$ and $S_{b2}$ which indicate a position in the halftone dot $A_{H2}$ along the address directions $i_{b1}$ and $j_{b2}$. The pattern data memory 23 outputs one of the halftone dot data $S_{db}$ of a particular pixel designated by the address signals $S_{b1}$ and $S_{b2}$.

The halftone dot signals $S_{da}$ and $S_{db}$ outputted from the comparator 19 and the pattern data memory 23 are supplied to selector 24, and one of them is selected therein as described later.

The signal processing unit 101 further comprises a threshold data setter 20 and a comparator 21 which function together as a means D for detecting whether the image signal $S_i$ corresponds to a solid area or a halftone area.

The threshold data setter 20 stores threshold data $D_t$ for the image signals $S_i$. The threshold data $D_t$ is used to detect whether the image signal $S_i$ corresponds to a solid area or to a halftone area. As was described before, the halftone area rate of the solid area depends on various printing conditions. The threshold data $D_t$ is determined by considering the printing conditions stored in the threshold data setter 20 in advance. For example, the threshold data $D_t$ may be set at the value of the image signal $S_i$ corresponding to the halftone area rate of 75%.

The comparator 21 compares the threshold data $D_t$ with the value of the image signal $S_i$. When the value of the image signals $S_i$ is no less than the threshold data $D_t$, the comparator 21 raises a solid-area indication signal $S_s$ to a "1" level. On the other hand, when the value of the image signal $S_i$ is less than the threshold data $D_t$, the solid-area indication signal $S_s$ assumes a "0" level.

The selector 24 receives the halftone dot signals $S_{da}$ and $S_{db}$ from the comparator 19 and the pattern data memory 23, respectively, and selects one of the signals $S_{da}$ and $S_{db}$ according to the solid-area indication signals $S_s$ supplied from the comparator 21. The selector 24 functions as a means F for selecting one of two halftone dot signals correponding to a solid area and a halftone area, respectively. When the pick-up head 7 is scanning a halftone area in the original 1, the value of the image signal $S_i$ is less than the threshold data $D_t$. Therefore, the solid-area indication signal $S_s$ becomes "0" level, and the selector 24 selects the signal $S_{da}$ and outputs it as a light modulation signal $S_{d1}$. On the other hand, when the pick-up head 7 is scanning a solid area in the original 1, that is, when the value of the image signal $S_i$ is equal to or greater than the threshold data $D_t$, the solid-area indication signals $S_s$ assumes a "1" level. Accordingly, the selector 24 selects the signal $S_{db}$ and outputs the same as the light modulation signal $S_{d1}$.

The recording head 8 receives the light modulation signal $S_{d1}$ and uses it to turn a light beam on and off. In the halftone area of the original 1, the recording head 8 exposes photosensitive material 4 according to the halftone pattern data $S_h$ stored in the pattern data memory 18. Respective halftone areas of the four color separation images are recorded with the screen angles of 0°, 15°, 45° and 75°, for example; that prevents the moire from appearing on a printed sheet. On the other hand, in the solid area, the recording head 8 exposes the photosensitive material 4 according to the halftone dot data $S_{db}$ stored in the pattern data memory 23. Therefore, respective solid areas of the four color separation images are recorded with the same screen angles of about 45°; that prevents the printed sheet from being mottled in the solid area. Consequently, the halftone area and the solid area in a single color separation image are both produced with the halftone image scanner shown in FIGS. 2A and 2B.

Figure 6A:
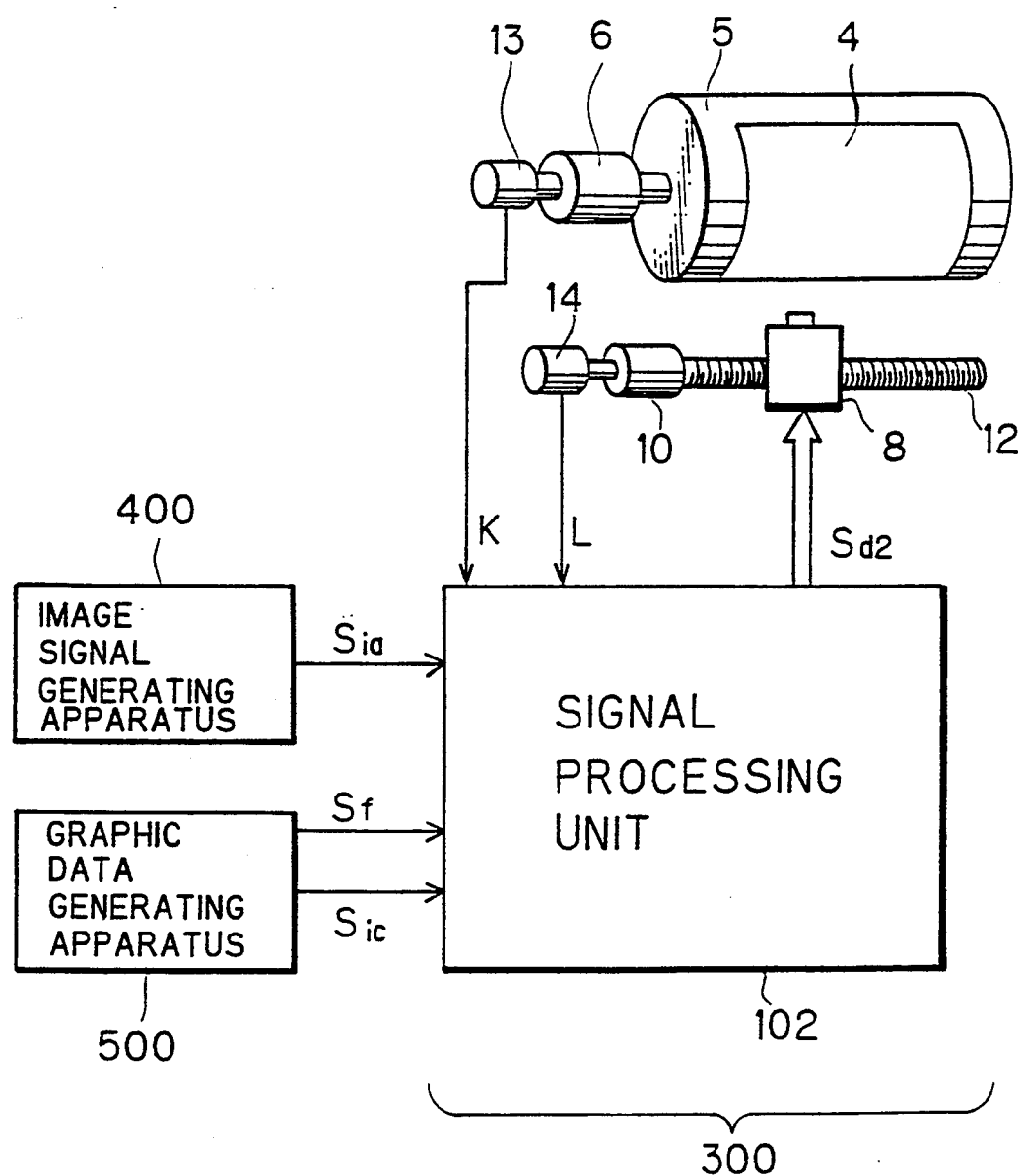
FIGS. 6A and 6B are block diagrams showing the structure of another embodiment of the present invention.

FIG. 6A is a block diagram shows another embodiment of the structure of a halftone image scanning system of the present invention. The halftone image scanning system comprises a halftone image scanner 300, an image signal generating apparatus 400 and a graphic data generating apparatus 500.

The halftone image scanner 300 does not include the reading drum 2, the motor 3, the pick-up head 7, the feed screw 11 and the motor 9 shown in FIG. 2A. Instead, the halftone image scanner 300 receives image signals $S_{ia}$ and $S_{ic}$ from the image signal generating apparatus 400 and the graphic data generating apparatus 500, respectively.

The image signal generating apparatus 400 generates the image signal $S_{ia}$ which represents four color separation images of a scene containing a human figure or the like. The image signal generating apparatus 400 may be constructed as a reading scanner having a reading drum and a pick-up head similar to those shown in FIG. 2A, a system for editing given image data, or a color page make-up system.

The graphic data generating apparatus 500 generates graphic data signal $S_{ic}$ which represents a drawing including an outline and a tint area inside and/or outside of the outline. The tint area is an area having a uniform halftone area rate. The graphic data signal $S_{ic}$ represents a drawing with respect to a pixel whose size is one-fifth of the pixel $A_{p1}$ defined for the image signal $S_{ia}$ (or $S_i$ in FIG. 2A), to reproduce the outline in the drawing minutely. Therefore, the frequency of the graphic data signal $S_{ic}$ is five times that of the image signal $S_{ia}$.

Figure 6B:
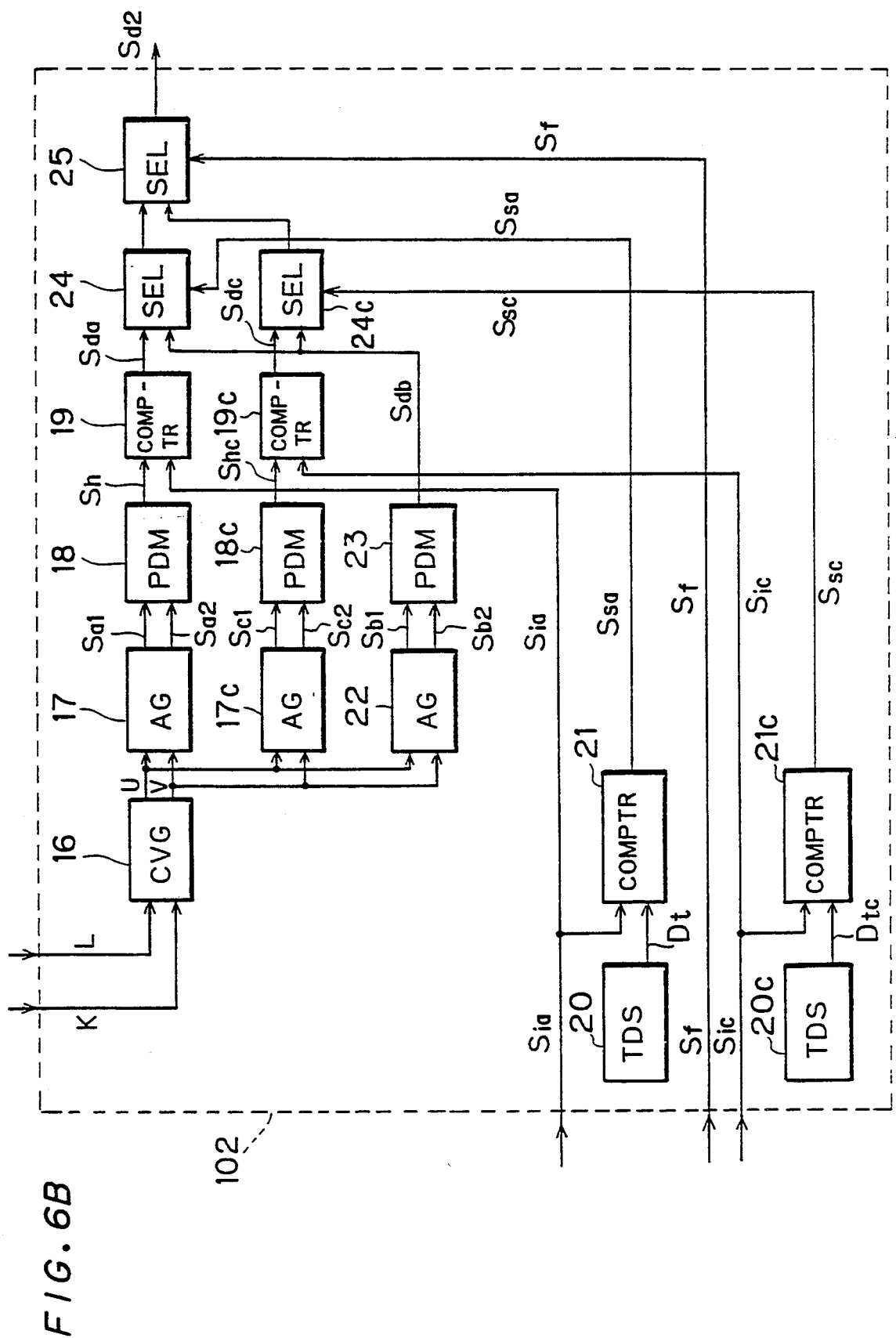

FIG. 6B is a block diagram showing the internal structure of the signal processing unit 102 of the halftone image scanner 300. The unit 102 has the structure which is formed by adding an address generator 17c, a pattern data memory 18c, a comparator 19c, selectors 24c and 25, a threshold data setter 20c and a comparator 21c to the signal processing unit 101 of FIG. 2B, and by omitting the color computation circuit 15 from the unit 101.

The components 16, 17, 18, 19, 20, 21, 22, 23 and 24 treat the image signal $S_{ia}$ in the same way as the corresponding elements of FIG. 2A treat the image signal $S_i$.

The components 17c, 18c, 19c and 24c are connected parallel to the components 17, 18, 19 and 24. Upon receiving the coordinate values U and V from the coordinate value generator 16, the address generator 17c generates reading address signals $S_{c1}$ and $S_{c2}$, which are similar to the reading address signals $S_{a1}$ and $S_{a2}$. The pattern data memory 18c stores halftone pattern data $S_{hc}$ with respect to a pixel whose size is one-fifth of the pixel $A_{p1}$. The halftone pattern data $S_{hc}$ are prepared for respective four color separation images which have respective screen angles to prevent the moire. The halftone pattern memory 18c outputs one of the halftone pattern data $S_{hc}$ at a particular pixel designated by the address signals $S_{c1}$ and $S_{c2}$. The halftone pattern data $S_{hc}$ is supplied to the comparator 19c and compared therein with the graphic data signal $S_{ic}$. If the value of the graphic data signal $S_{ic}$ is greater than the halftone pattern data $S_{hc}$, the halftone dot signal $S_{dc}$ from the comparator 19c assumes a "1" level. On the contrary, if the value of the graphic data signal $S_{ic}$ is equal to or greater than the halftone pattern data $S_{hc}$, the halftone dot signal $S_{dc}$ assumes a "0" level.

The threshold data setter 20c and the comparator 21c have the same functions as the threshold data setter 20 and the comparator 21. The threshold data setter 20c stores a threshold data $D_{tc}$ which is used to detect whether the graphic data signal $S_{ic}$ corresponds to a solid area or to a halftone area. The threshold data $D_t$ and $D_{tc}$ stored in the threshold data setters 20 and 20c may be different. When the value of the image signal $S_{ic}$ is no less than the threshold data $D_{tc}$, the comparator 21c raises a solid-area indication signal $S_{sc}$ to a "1" level. On the other hand, when the value of the image signal $S_{ic}$ is less than the threshold data $D_{tc}$, the solid-area indication signal $S_{sc}$ becomes "0".

The selector 24c receives the halftone dot signals $S_{dc}$ and $S_{db}$ from the comparator 19c and the pattern data memory 23, and selects one of the signals $S_{dc}$ and $S_{db}$ according to the solid-area indication signal $S_{sc}$.

The graphic data generating apparatus 500 supplies a flag signal $S_f$ as well as the graphic data signal $S_{ic}$ to the signal processing unit 102. The flag signal indicates whether or not the apparatus 500 is supplying the graphic data signal $S_{ic}$. When the flag signal indicates that the graphic data signal $S_{ic}$ is being supplied, the selector 25 selects the output signal of the selector 24c in response to the flag signal $S_f$, and outputs the same as a light modulation signal $S_{d2}$. On the other hand, when the flag signal does not indicate that the graphic data signal $S_{ic}$ is being supplied, the selector 25 selects the output signal of the selector 24, and outputs the same as the light modulation signal $S_{d2}$.

The halftone image scanning system can produce color separation images on the basis of the image signal $S_{ia}$ or the graphic data signal $S_{ic}$. In either case, a solid area and a halftone area in a single color separation image are recorded with respective halftone data, more specifically, the halftone pattern data $S_h$ or $S_{hc}$ representing a changeable shape of a halftone dot in the halftone area and the halftone dot data $S_{db}$ representing a shape of a halftone dot in the solid area, respectively. Because the halftone dot data $S_{db}$ for the solid area has a screen angle of about 45 degrees, mottling of the printed paper is prevented.

The halftone dot data $S_{db}$ may be of other types, such as data representing ground tint, data representing a solid area with different screen ruling from a halftone area, or the like. Namely, any halftone data can be used on condition that different types of halftone data are applied to the solid area and the halftone area.

The present invention may be also applied to an electron beam carving apparatus disclosed in Japanese patent Laying Open Gazette 58-72450.

According to the present invention, a solid area in an original is automatically detected and recorded with different halftone data from that being recorded on a halftone area. Because the solid area and the halftone area in a single image are sequentially recorded without manual labor involving tasks, such as pasting films of the solid areas on color separation films etc., the printing process can be efficiently executed.

Further, when the halftone data with the screen angle of about 45 degrees are used for the solid area commonly to the color separation images in the inverted gravure process, mottling of a printed sheet in the solid area is prevented.

Although the present invention has been described and illustrated in detail, it is to be clearly understood that the same is by way of illustration and example only and is not to be taken by way of limitation. The spirit and scope of the present invention should be limited only by the terms of the appended claims.

What is claimed is:

1. An apparatus for recording a halftone image which includes a halftone area and a solid area, said apparatus comprising:

recording means for recording the halftone image;

first means for providing first halftone data representing said halftone image in said halftone area and for providing second halftone data associated with said solid area;

second means, coupled to said first means, for generating a first halftone dot signal for said halftone area and a second halftone dot signal for said solid area;

means for generating a detection signal indicating a location of said halftone area and said solid area on said halftone image; and means for selecting and supplying to the recording means one of said first halftone dot signal and said second halftone dot signal according to said detection signal.

2. An apparatus for recording a halftone image on a photosensitive material comprising:

(a) scanning means for photoelectrically scanning an original image including a gradation area and a solid area to obtain an image signal representing said original image for each position on said original image;

(b) signal converter means for converting said image signal into a halftone dot recording signal; and (c) recording means for scanning a photosensitive material with a photobeam to record a halftone dot image on said photosensitive material in response to said halftone dot recording signal;

wherein said recording means comprises:

(c-1) position detector means for detecting a position on said photosensitive material currently exposed by said photobeam and means for generating coordinate signals representing coordinate values of said detected position on said photosensitive material; and said signal converter means comprises:

(b-1) first screen pattern holding means coupled to said position detector means for holding first screen pattern signals and operable to selectively output one of said first screen pattern signals in response to said coordinate signals;

(b-2) comparator means for comparing said image signal with said one of said first screen pattern signals to generate a first halftone dot signal;

(b-3) second screen pattern holding means coupled to said position detector means for holding second screen pattern signals representing a screen pattern having a prescribed halftone area rate, and operable to select one of said second screen pattern signals in response to said coordinate signals to obtain a second halftone dot signal;

(b-4) detector means for detecting a level of said image signal to generate an area-indication signal indicating whether said image signal represents said gradation area or said solid area; and (b-5) selector means for selecting one of said first and second halftone dot signals in response to said area-indication signal to obtain said halftone dot recording signal.

3. The apparatus of claim 2, wherein said detector means comprises:

means for comparing said image signal with a reference signal to generate said area-indication signal.

4. The apparatus of claim 3, wherein
said original image is a color image,
said image signal is generated for each color component of said original image,
said recorder means is operable to generate a plurality of color separation images on said photosensitive material,
said first halftone dot signal is generated for each color separation image, and
said second halftone dot signal is generated for said plurality of color separation images in common.

5. The apparatus of claim 4, wherein
said second halftone pattern signals represent a solid halftone pattern having a screen angle of about 45°.

6. A method of recording a halftone image on a photosensitive material, comprising the steps of:

(a) photoelectrically scanning an original image including a gradation area and a solid area to obtain an image signal representing said original image for each position on said original image;

(b) converting said image signal into a halftone dot recording signal; and (c) scanning a photosensitive material with a photobeam of a recorder means to record a halftone dot image on said photosensitive material in response to said halftone dot recording signal;

wherein the step (c) comprises the step of:

(c-1) detecting a position on said photosensitive material currently exposed by said photobeam to generate coordinate signals representing coordinate values of a point on said photosensitive material; and the step (b) comprises the steps of:

(b-1) selectively outputting one of predetermined first screen pattern signals in response to said coordinate signals;

(b-2) comparing said image signal with said one of said first screen pattern signals to generate a first halftone dot signal;

(b-3) in response to said coordinate signals, selecting one of predetermined second screen pattern signals representing a screen pattern having a prescribed halftone area rate, to obtain a second halftone dot signal;

(b-4) detecting a level of said image signal to generate an area-indication signal indicating whether said image signal represents said gradation area or said solid area; and (b-5) selecting one of said first and second halftone dot signals in response to said area-indication signal to obtain said halftone dot recording signal.

7. The method of claim 6, wherein the step (b-4) comprises the step of:

comparing said image signal with a reference signal to generate said area-indication signal.

8. The method of claim 7, wherein
said original image is a color image,
said image signal is generated for each color component of said original image,
said recorder means is operable to generate a plurality of color separation images on said photosensitive material,
said first halftone dot signal is generated for each color separation image, and
said second halftone dot signal is generated for said plurality of color separation images in common.

9. The method of claim 8, wherein
said second halftone pattern signals represent a solid halftone pattern having a screen angle of about 45°.

* * * * *